Jan. 1, 1935. C. L. THOMAS 1,986,487
POWER OPERATED BRAKE MECHANISM
Filed Dec. 10, 1932
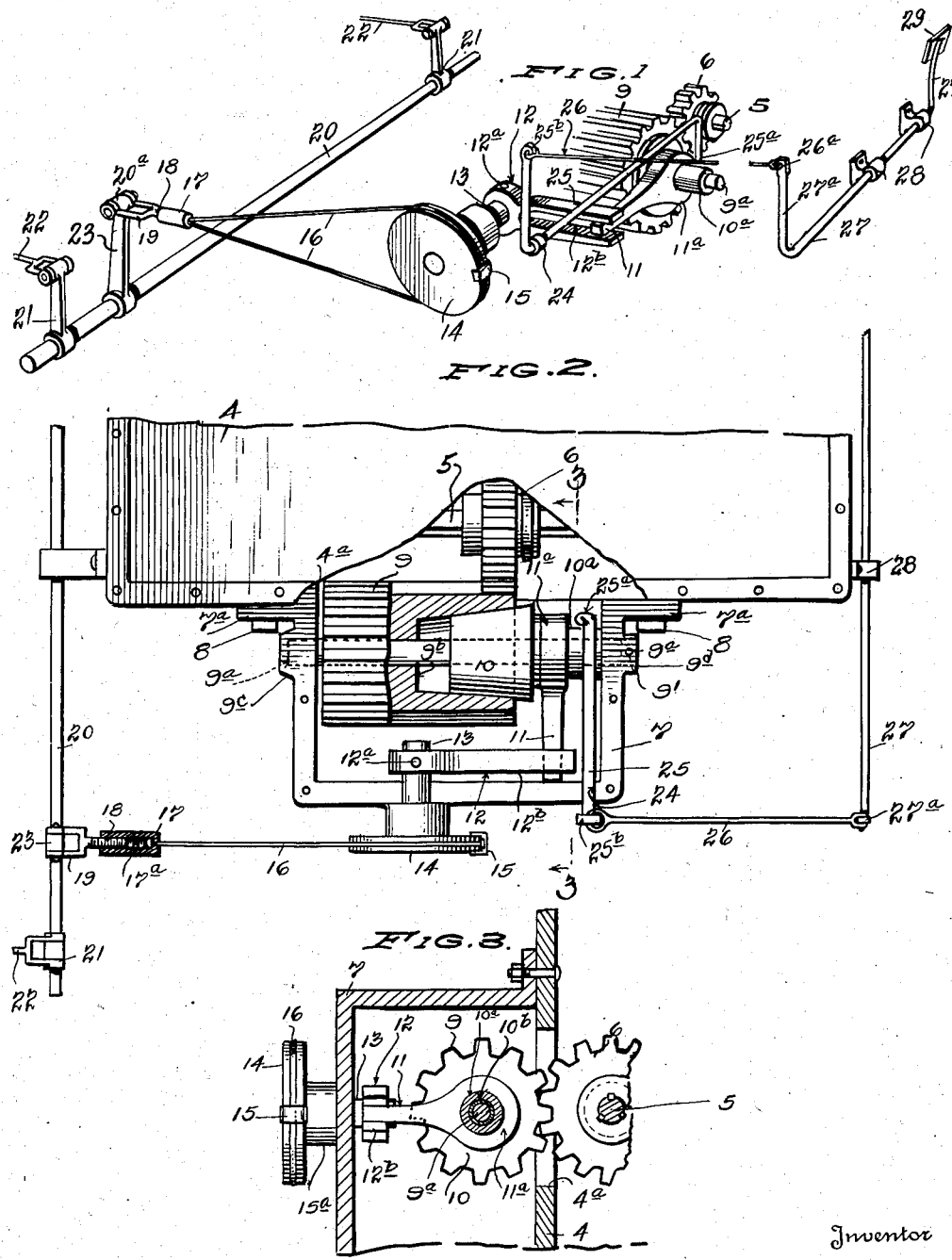

Patented Jan. 1, 1935

1,986,487

UNITED STATES PATENT OFFICE 1,986,487

POWER OPERATED BRAKE MECHANISM

Claud L. Thomas, Tulsa, Okla., assignor of one-third to Glenn J. Smith and one-third to Ira R. Goodsell, both of Tulsa, Okla.

Application December 10, 1932, Serial No. 646,647

5 Claims. (Cl. 188—140)

My invention relates to improvements in brake operating mechanism for motor vehicles and the like, and more particularly to a power operating mechanism therefor.

Briefly stated, the invention has for its primary object to provide a highly simplified and efficient power operated braking mechanism which will be very simple in construction, very compact, and which can be readily applied to a motor vehicle without substantial modification thereof and without the exercise of unusual skill.

Another object of the invention is to provide a mechanical brake operating mechanism in the nature of a transmission attachment.

The invention also resides in certain novel features of construction, combination and arrangement of parts, and in modes of operation as will be readily understood by those skilled in the art upon reference to the accompanying drawing in connection with the detailed description appearing hereinafter.

The drawing illustrates what now appears to be a preferred form of the invention. However, various changes and modifications may be made therein within the spirit and scope of the subject matter claimed hereinafter.

In the drawing:

Figure 1 is a perspective view illustrating the working parts of the mechanism;

Figure 2 is a plan view partly in section and illustrating a portion of the transmission case with my attachment mounted thereon,—the cover of the attachment being removed to disclose the mechanism within and certain portions of the mechanism being shown in section;

Figure 3 is a sectional view taken on line 3—3 of Figure 2.

Referring specifically to the drawing wherein the same reference characters have been used to designate the same parts in all views, numeral 4 designates the transmission housing which is of usual form and incorporates the driven spline shaft 5 upon which is mounted the sliding pinion 6 which is adapted to effect the low speed, or reversing, drive of the automobile, or other vehicle, and which constantly rotates when the vehicle is in motion.

Figure 2 clearly illustrates that the transmission casing 4 has a cutout, or opening, 4a of a length equal to the length of travel of the pinion 6 on the spline shaft 5.

The pinion 6 constantly meshes with an elongated pinion or gear 9 mounted on the shaft 9a carried in the bearings 9b, 9c of the gear casing 7,—which is illustrated as an attachment to the transmission 4, although, of course, it may be made integral therewith.

The gear casing 7 is bolted as at 8 to the transmission housing 4,—the gear casing having a flange 7a extending thereabout, and between which and the transmission housing, there may be suitable packing so as to make an oil tight joint. The elongated gear 9, of course, registers with the opening 4a of the transmission housing and projects therethrough, as illustrated for constant mesh with the sliding pinion 6 no matter what the position of same be on the spline shaft 5.

The gear 9 may be bronze bushed so as to provide a proper wear resisting anti-friction bearing upon shaft 9a, or there may, within the scope of the invention, be employed any suitable type of anti-friction bearing between shaft 9a and gear 9. Clutch 10 and sleeve 10a are bronze bushed as at 10b (Fig. 3).

Figure 2 illustrate very clearly that one end of the gear 9 is provided with a fustro-conical recess 9b into which is adapted to be forced the clutch element 10 having the rearwardly extending sleeve extension 10a on which is rigidly keyed, or otherwise secured, the bearing end 11a of a lever 11, whose outer end (see Figure 3) is disposed in the slotted or bifurcated end 12b of a lever 12 which is rigidly secured as at 12a on a shaft 13.

On the outer end of shaft 13 is the pulley 14, whose periphery is grooved to receive the cable 16. A suitable clamp element 15 serves to lock the cable 16 to the pulley 14.

The ends of the cable 16 are brought together and are secured in the socket element 17, which latter is interiorly threaded as at 17a to receive the shank 18 of the yoke element 19, which is pivotally connected as at 20a to an arm 23 which is rigid with the brake operating cross shaft 20.

Numerals 21, 22, designate, respectfully, the arms and brake operating connections carried thereby. The connections 22 lead to the vehicle brakes and are adapted to operate same in the usual way. The drawing indicates only two wheel brakes, but obviously there may be brakes on each of the vehicle wheels and operated in accordance with any of the "four wheel" brake operating mechanisms.

A shaft 25 suitably mounted in bearing 24 (see Figure 1) is carried by the gear casing 7. This rod or shaft 25 has its laterally bent inner end 25a operatively engaged with the sleeve 10a of the clutch element 10, whereby the latter can be slid in and out of clutching engagement with the gear 9.

The outer end of the shaft 25 extends upwardly as indicated at 25b and has the pivot connection (see Figure 1) with the rod 26.

The rod 26 in turn is pivoted to the upstanding end 27a of the shaft 27 which is secured in suitable bearings 28 carried by the transmission housing 28. The inner end of shaft 27 is upturned, as indicated at 27b, to extend through the floor board (not shown) of the car, and has the foot pedal portion 29, illustrated in Figure 1.

From the foregoing description taken in connection with the accompanying drawing it will be apparent that when the operator of the automobile desires to apply the brake, he simply presses lightly on the pedal 29 which rocks the shaft 27 in a clockwise direction (Figure 1) to drag the arm 25b clockwise, through connection 26, to cause the inner end of shaft 25 to force the clutch 10 inwardly into clutching engagement with the recess 9b in the gear 9. This causes clutch 10 with its sleeve 10a to turn, or tend to turn, so that the arm 11 which is fast on the clutch sleeve 10a rocks the lever 12 to swing pulley 14, and actuate brake shaft 20 through the cable connection 16 and the associated connections 17, 18, 19, 20a.

Thus, the power shaft of the car or the driving mechanism is caused to apply the braking force.

Particular attention is directed to the fact that the clutch element 10, 10a, not only is adapted to move lineally of shaft 9, but is also adapted to rotate, or swing thereon, so as to actuate the pulley 14 through the levers 11, 12.

The clutch 10 and the recess 9b may be suitably faced with leather or otherwise to provide a friction surface.

The shaft 9a is prevented from turning by the key 9' secured in the bearings 9c, 9d.

Having thus described my invention, what I claim is:

1. A power operated braking mechanism for the brake operating shaft of an automobile, or the like, comprising a gear constantly driven by a portion of the automobile power plant when the same is in motion, said gear having an internal clutch engaging portion, a clutch element coaxial with said gear and slidable to engagement with one end thereof whereby such clutch element will tend to rotate with said gear, brake lever-operated means for engaging said clutch with said gear, and means including interengaging levers for operating the brakes when the clutch and gear are in engagement, and one of said levers being carried by said clutch element.

2. A transmission operated braking mechanism comprising in combination with the slidable first speed and reversing pinion of the transmission, a gear arranged to constantly engage said pinion at any one of its several positions to be driven thereby, a pair of interengageable clutch portions, one of said clutch portions being provided by and located within said last mentioned gear, pedal operated means for bringing said clutch portions into engagement, and brake operating means carried by the other clutch portion.

3. A transmission attachment comprising a gear casing, an elongated gear in said casing and adapted to mesh with the sliding first and reverse speed pinion of the transmission which is constantly driven when the car is in motion, a clutch element in said gear casing and cooperatively engageable with a clutch surface provided within said elongated gear, a shaft rotatably supporting said elongated gear and slidably and rotatably supporting said clutch element, said clutch element having a rearward sleeve extension, means for operating said clutch element and engaging said sleeve, and brake operating means including a lever carried by said sleeve.

4. In a power-operated brake actuating mechanism for automobile transmissions and the like, a support, a shaft carried by said support, a gear journalled on said shaft and adapted to be driven when the automobile is in motion, said gear having an internal clutch portion at one end, a brake lever-operated clutch element slidably and rotatably mounted on said shaft and engageable with the clutch portion of said gear to tend to rotate therewith, a second shaft journalled on said support, a brake operating connection carried by said last-mentioned shaft, and interengaging levers fixedly carried by said clutch element and second-mentioned shaft for rocking the latter and applying the brakes when the clutch element is engaged with the clutch portion of said gear.

5. In a power-operated brake actuating mechanism for automobile transmissions and the like, a support, a shaft carried by said support, a gear journalled on said shaft and adapted to be driven when the automobile is in motion, said gear having an internal clutch portion at one end, a brake lever-operated clutch element slidably and rotatably mounted on said shaft and engageable with the clutch portion of said gear to tend to rotate therewith, a second shaft journalled on said support, said second shaft being substantially perpendicular to said first-mentioned shaft, a brake operating connection carried by said last-mentioned shaft, and substantially right angularly disposed slidably interengaging levers fixedly carried by said clutch element and second-mentioned shaft for rocking the latter and applying the brakes when the clutch element is engaged with the clutch portion of said gear.

CLAUD L. THOMAS.